Sept. 28, 1926.
D. MacKENZIE
SOUND RECORDING
Filed Oct. 16, 1924
1,601,078
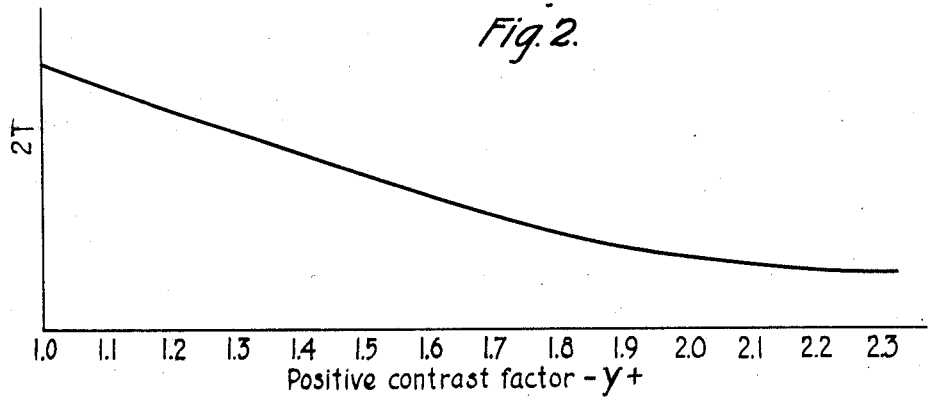
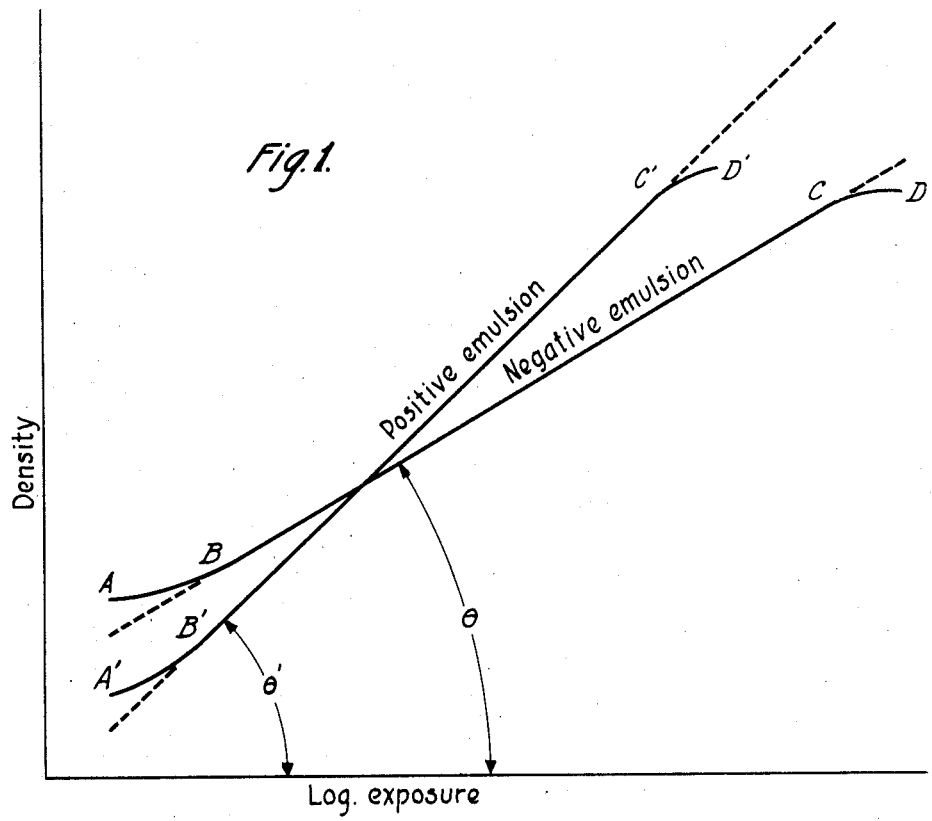
Inventor:
Donald MacKenzie
by E. W. Adam  Att'y.

Patented Sept. 28, 1926.

1,601,078

UNITED STATES PATENT OFFICE.

DONALD MacKENZIE, OF EAST ORANGE, NEW JERSEY, ASSIGNOR TO WESTERN ELECTRIC COMPANY, INCORPORATED, OF NEW YORK, N. Y., A CORPORATION OF NEW YORK.

SOUND RECORDING.

Application filed October 16, 1924. Serial No. 743,904.

This invention relates to sound recording and particularly to the making of photographic sound records.

An object of the invention is to provide a method of, and means for, producing efficient photographic sound records, such as are used, for example, in talking motion pictures.

Photographic sound records may be made by any of the well known light-modulation methods. Most of the usual methods involve the transformation of sound variations into electrical variations, which are in turn made to cause proportional variations in the quantity of light focused on a moving sensitized film through a slit in a screen. The exposure of the film, which is the intensity of illumination multiplied by the time of exposure, will therefore, vary in accordance with the sound variations. The exposed film is developed in a suitable manner to form the negative sound record, the record of the sounds being in the form of a series of striations of varying opacity on the film. From this negative film a positive record is made by the contact process or other means. This positive record, when suitably developed, is used to reproduce the original sounds recorded. One method of reproduction comprises subjecting the continuously moving positive film to rays of light transmitted through a narrow slit of constant width. The transmitted light, varying in accordance with the striations on the film, is focused on a cell sensitive to light, such as a photo-electric cell, connected in an electric circuit. The variations of light will cause variations of the electric current through the cell, which variations will be proportional to the recorded sound waves. The varying current is caused directly or indirectly to act upon suitable telephone apparatus, such as a loud speaker, to reproduce the original sounds recorded.

Due to the limitations of the apparatus used in recording the sounds, there will be a considerable loss in the volume of useful sound (or increased amplification necessary to secure the same volume) in transferring the sound waves to a photographic film. The volume range of the final sound wave record may be reduced, for example, because of the overload limitations of the recording apparatus used or because of interference with noises inherent in this apparatus. It is of course, desirable, in order to avoid interference due to undue amplification of vacuum tube noises and noises inherent in photoelectric cells, to get as much light through the film as possible. This means avoiding the production of sound record films having too great a mean density.

In accordance with the invention, it has been found that the mean density of the final sound record may be decreased, and, therefore, the volume of useful sound initially obtainable from sound record films greatly increased, if the positive and negative sound records are both made on films having thereon a rich fine grained emulsion having inherently great contrast, such as is used, for example, in standard positive motion picture film, and if the development of both films is so chosen as to give unit contrast.

The invention will be clear from the following detailed description read in connection with the accompanying drawing in which Fig. 1 shows the characteristic curves of standard positive and negative motion picture emulsions, and Fig. 2 shows how the transmission of a film varies with the positive contrast factor.

In Fig. 1 are shown characteristic curves of standard positive and negative photographic film emulsions, as determined from sensitometer tests. As is well known, standard positive film has a rich fine-grained emulsion having inherently great contrast, and is commercially referred to as a slow film, while standard negative photographic film has a thin coarse-grained emulsion and is commercially referred to as a fast film. However, the relative speed of films as given by the commercial designations has reference more to the lower light intensities, and for the upper range of light intensities, there is very little difference in speed between what is known as a slow film and the so-called fast film, which is ordinarily used in making photographic negatives.

In the curves, of Fig. 1, density is plotted against log exposure. In the photographic art, the density of a film is defined as the logarithm of the opacity. By the "opacity" of a film is meant the reciprocal of the transmission. Thus, if we have light of intensity I falling upon a silver deposit, and the deposit transmits an intensity I', then we may write—

Transmission as—

$$T = \frac{I'}{I}$$

Opacity as—

$$O = \frac{1}{T} = \frac{I}{I'}$$

Density as—

$$D = \log O = \log \frac{I}{I'}$$

Referring to the curves, it will be noted that over the portion AB of the negative emulsion curve, the density gradually increases with exposure. In this range the film will be under-exposed. The straight line BC of the negative emulsion curve represents the range where the density shows a uniform rise for equal logarithmic increases in exposure. This is termed the range of correct exposure. Over the portion CD of the curve, density increases with exposure at a diminishing rate. This corresponds to the range of over-exposure. Similarly, for the positive emulsion curve there is a range of under-exposure A'B', a range of perfect exposure B'C', and a range of over-exposure C'D'. The tangents of the angles, $\theta$ and $\theta'$, which the straight line portions BC and B'C' of the negative emulsion curve and the positive emulsion curve respectively make with the exposure axis, are known as the negative contrast factor and the positive contrast factor respectively. The positive and negative contrast factors are usually designated as $y+$ and $y-$, respectively. The values of log exposure at which the characteristic curves begin to be straight are independent of the development, but the steepness of the straight line portions, and therefore the contrast factors $y-$ and $y+$, increase as the time of development increases. In the curves as shown in Fig. 1, the time of development of the negative emulsion was 3.5 minutes and that for the positive emulsion 2 minutes, this corresponding approximately to $y-=0.60$ and $y+=1.00$. It is evident therefore that unit contrast requires a much longer time of development for the negative emulsion than for the positive emulsion. It will be noted that both curves begin to be straight at approximately the same exposure. For perfect sound transfer, both positive and negative emulsions must be exposed in such a manner as not to exceed their straight line range.

When a sound wave is recorded on a negative and the latter printed, the print should be such as to give faithful contrast reproduction. Now, it is well known in photography, that for exact reproduction of contrast, the development of the positive print must be such as to give a contrast factor equal to the reciprocal of that prevailing in the negative from which the positive is printed, that is, the product of the negative and the positive contrast factors must be equal to unity. Also, the exposure of the positive must insure that the negative record is printed throughout within the straight line range of the positive emulsion, and the least transparent region of the negative should, for greatest transparency of the positive print at the lowest density of the positive emulsion consistent with the straight line requirement.

The length of the straight line portion of the characteristic of an emulsion is called the "latitude" of the material. This latitude varies a great deal with different emulsions being less in contrasty, fine-grained emulsions, such as are used in standard positive film, than in coarse-grained thin emulsions, such as are used in standard negative films. In the particular emulsions used for which curves are shown in Fig. 1, the logarithmic exposure latitude for the negative emulsion is 2.0 and that for the positive emulsion is 1.2. The transmission range of the negative film is obviously the exposure range of the positive printed from it. Therefore, if the logarithmic range used in the negative record is the greatest allowable, namely 2.0, the development of the negative must be such as to compress this logarithmic exposure range of 2.0 into a logarithmic transmission range of 1.2 or less, that is to say, the negative must be developed for a contrast factor of 0.6. If a narrower range of negative exposure obtains, a higher negative contrast may be permitted. In general, if the positive range is log R+ and the negative range log R−, the development of the negative should be such that the contrast factor does not exceed $$y- = \frac{\log R+}{\log R-}.$$

Correspondingly a positive printed from this negative must reexpand the transmission range of the negative so that the positive shall have a transmission range equal to the exposure range used in making the negative. That is, the positive development must correspond to the contrast factor $$y+ = \frac{1}{y-}.$$

Now, unit contrast may be obtained with negative emulsion if the development is prolonged sufficiently. However, it has been found that if the development of the negative emulsion is carried far enough to obtain that result, chemical fog will be obtained on the negative to such an extent as to make the negative record worthless. This may be due in part at least to the deterioration of the developer due to the increased time used in development. Because of this chemical fog in development, the negative development must be limited to $y-=0.75$. The corresponding positive development to give faithful contrast reproduction will be $y+=1.33$.

Fig. 2 shows the variations of the transmission at the lower end of the straight line portion of the standard positive emulsion characteristic with various values of the positive contrast factor, as determined from sensitometer tests. If T is the average transmission of the positive, the transmission at the lower end of the straight line is 2 T. It will be noted that the transmission falls off gradually as the positive contrast factor increases above unity. As noted above, because of the risk of fog, the negative development is limited to $y-=0.75$ and for unit contrast the corresponding positive development is $y+=1.33$. Under such conditions, the average density of the positive film will be such as not to give an efficient transmission of light in the reproduction process. The transfer attenuation or loss of volume under such conditions has been measured and found to be in transmission units about 16.5 t. u. This loss cannot be decreased by increasing the light intensity used. It has been determined experimentally that doubling the light strength will not reduce the loss while quadrupling the intensity of the light will increase this loss by 1.0 t. u.

It is likewise undesirable to increase the area of exposure by widening the aperture through which the light is directed on the film, because the limiting frequency for a given speed is inversely proportional to the aperture width. Therefore, this would result in an undesirable limitation of the frequency range. At present, at a film speed of 15″ per second a tone of 7000 cycles is readily recorded and printed by suitable photographic handling, and this limit should not be lowered.

Now it has been found in accordance with this invention that if both the negative sound record and the positive print thereof are made on a rich fine-grained emulsion having inherently high contrast, having a characteristic such as shown for the positive emulsion in Fig. 1, the positive being printed from the negative in the customary manner, and both films developed to unit contrast, the chemical fog is so slight as not to constitute a limitation. Moreover, the inherently contrast nature of such an emulsion makes it possible to obtain unit contrast without prolonged development. It has been determined experimentally that the transfer attenuation under such conditions is 14.5 t. u., as compared with 16.5 t. u. when standard negative emulsion is used for making the negative. Thus, an increase of 2.5 transmission units is obtained.

An additional advantage is obtained by using standard positive emulsion in making the negative in that such an emulsion has a higher resolving power than standard negative emulsion, and, therefore the successive striations do not merge into each other so much. Thus, improved definition in the final record is obtained.

What is claimed is:

1. The method of making photographic sound records which comprises making a negative record of the sounds on a rich, fine-grained photographic emulsion having inherently great contrast, developing said negative record for unit contrast, printing a positive record from said negative on an emulsion having the same characteristic as said first mentioned emulsion, and developing said positive record for unit contrast.

2. The method of increasing the volume of sound obtainable from a given light intensity working through a photographic sound record which consists in making the negative sound record on a rich, fine-grained photographic emulsion having inherently great contrast, and printing therefrom a positive record on an emulsion of like characteristic, and developing said negative sound record and said positive record to give unit contrast.

3. In the art of photographically recording sound variations, the method comprising using a rich, fine-grained photographic emulsion having inherently great contrast for making a negative record of the sound variations, using an emulsion of like characteristic for making a positive record of the sound variation, from said negative record, and developing both said negative record and said positive record so as to obtain unit contrast for each.

In witness whereof, I hereunto subscribe my name this 10th day of October A. D., 1924.

DONALD MacKENZIE.